United States Patent
Yoshida et al.

(10) Patent No.: US 7,025,429 B2
(45) Date of Patent: Apr. 11, 2006

(54) DRIVE ASSEMBLY FOR A TRACK-TYPE VEHICLE

(75) Inventors: Tsuyoshi Yoshida, Katano (JP); Kazushi Nakata, Katano (JP); Shota Murakami, Hirakata (JP)

(73) Assignee: Komatsu Ltd., Tokyo (JP)

( * ) Notice: Subject to any disclaimer, the term of this patent is extended or adjusted under 35 U.S.C. 154(b) by 115 days.

(21) Appl. No.: 10/774,394

(22) Filed: Feb. 10, 2004

(65) Prior Publication Data

US 2005/0173981 A1   Aug. 11, 2005

(51) Int. Cl.
B62D 55/108   (2006.01)

(52) U.S. Cl. ............... 305/132; 305/129; 305/133; 180/9.54

(58) Field of Classification Search .......... 305/124, 305/125, 129, 130, 132, 133, 142; 180/9.1, 180/9.54

See application file for complete search history.

(56) References Cited

U.S. PATENT DOCUMENTS

| | | | |
|---|---|---|---|
| 758,757 A * | 5/1904 | Jones | ............... 180/9.44 |
| 2,051,864 A | 8/1936 | Knox et al. | |
| 2,093,456 A | 9/1937 | Knox | |
| 2,982,351 A | 5/1961 | Scott | |
| 3,082,043 A | 3/1963 | Orton | |
| 3,216,520 A | 11/1965 | Blonsky | |
| 3,601,454 A | 8/1971 | Reinsma | |
| 3,787,097 A | 1/1974 | Orr | |
| 3,826,325 A | 7/1974 | Purcell et al. | |
| 4,082,371 A | 4/1978 | Werner et al. | |
| 4,351,572 A | 9/1982 | Fujiwara et al. | |
| 4,361,363 A * | 11/1982 | Livesay | ............... 305/125 |
| 4,391,341 A | 7/1983 | Taghon | |
| 4,519,654 A | 5/1985 | Satzler et al. | |
| 4,553,790 A | 11/1985 | Boggs | |
| 4,582,367 A | 4/1986 | Jacquet et al. | |
| 4,583,791 A | 4/1986 | Nagata et al. | |
| 4,681,177 A | 7/1987 | Zborowski | |
| 4,744,431 A | 5/1988 | Stollinger | |
| 4,881,786 A | 11/1989 | Tonsor | |
| 5,749,423 A | 5/1998 | Burckhartzmeyer et al. | |
| 6,607,256 B1 | 8/2003 | Yoshida et al. | |
| 6,702,406 B1 * | 3/2004 | Yoshida et al. | ............ 305/100 |
| 2005/0206238 A1 | 9/2005 | Yoshida et al. | |

FOREIGN PATENT DOCUMENTS

| JP | 2-102883 | * | 4/1990 |
|---|---|---|---|
| JP | 5-319325 | * | 12/1993 |

* cited by examiner

*Primary Examiner*—Russell D. Stormer
(74) *Attorney, Agent, or Firm*—Posz Law Group, PLC

(57) ABSTRACT

A drive assembly for a track-type vehicle which makes the effective ground contact length within the tumbler distance as large as possible. The drive assembly has a single track roller unit disposed closest to the idler and closest to the sprocket respectively, each for supporting the track roller rotatably at the distal end portion of an arm attached at its proximal end portion rockably to the track frame and for bearing a vehicle body load at the distal end portion of the arm through elastic members, and a double track roller unit interposed between the single track roller units and including a first arm attached at its proximal end portion to the track frame and a second arm attached at its central portion to the distal end portion of the first arm, for supporting the paired lower rollers at the two end portions of the second arm.

2 Claims, 8 Drawing Sheets

DRIVE ASSEMBLY FOR A TRACK-TYPE VEHICLE

BACKGROUND OF THE INVENTION

1. Field of the Invention

The present invention relates to a drive assembly for a track-type vehicle.

2. Background Art

One drive assembly used in the prior art for a track-type vehicle is provided with bogie (or rocking type) track rollers for improving the riding comfortableness at the running time of the vehicle (as referred to FIG. 1 to FIG. 5 of U.S. Pat. No. 6,607,256). FIG. 7 is a side elevation of a bulldozer as the track-type vehicle disclosed in U.S. Pat. No. 6,607,256, and FIG. 8 is a side elevation of a drive assembly of the track-type vehicle. In FIGS. 7 and 8, the track-type vehicle is provided with a drive assembly having crawlers 6 below the right-hand and left-hand sides of its body. The drive assembly is provided with a track frame 1 arranged along the longitudinal direction of the vehicle, and an idler 2 and a sprocket 3 disposed on the two longitudinal end portions. Below the track frame 1 and at the position closest to the idler 2, the drive assembly is provided with a track roller 43, which is mounted rotatably at the distal end portion of an arm 41 of a single track roller unit 40. The arm 41 is so attached turnably to the track frame 1 as can be vertically rocked on a pin 42. Below the track frame 1 and between the single track roller unit 40 and the sprocket 3, on the other hand, there are provided a pair of longitudinal track rollers 11 and 12, which are mounted rotatably at the two end portions of a second arm 32 of a double track roller unit 10 having a first arm 31 in addition to the second arm 32. The first arm 31 is so attached at its proximal end portion to the track frame 1 as can be vertically rocked on a pin 33, and the second arm 32 is so attached at its central portion to the distal end portion of the first arm 31 as can be vertically rocked on a pin 35.

On the abutment portion between the distal end portion of the arm 41 of the single track roller unit 40 and the lower portion of the track frame 1 and at the abutment portion between the upper portion of the distal end portion of the first arm 31 of the double track roller unit 10 and the lower portion of the track frame 1, respectively, there are mounted elastic members 44a and 44b, and 34a and 34b, which have predetermined moduli of elasticity. The loads to be applied to the track roller 43 of the single track roller unit 40 and to the track rollers 11 and 12 of the double track roller unit 10 are respectively borne by the upper and lower elastic members 44a and 44b, and 34a and 34b through the arm 41 and the arms 32 and 31.

Here in the drive assembly for the track-type vehicle according to the prior art described above, the position for the track roller to support the vehicle load is located at the elastic members 44a and 44b in the single track roller unit 40 and is substantially identical to the position of the track roller 43. In the double track roller unit 10, on the contrary, the support position is located at that of the elastic members 34a and 34b and is substantially identical to the center position between the paired front and rear track rollers 11 and 12. Usually in the track-type drive assembly, the distance between the track rollers on the longitudinally outermost sides for supporting the vehicle load is called the "effective ground contact length", by which the stability at the vehicle running time is retained. Therefore, the effective ground contact length of the running device of the prior art is the distance between the track roller 43 of the single track roller unit 40, as located closest to the idler 2, and the center position between the front and rear track rollers 11 and 12 of the double track roller unit 10 located closest to the sprocket 3, so that the length is substantially shorter than the distance between the outermost track rollers. Merely in order to enlarge the effective ground contact length, generally speaking, it is naturally sufficient to elongate the distance (which will be called the "tumbler distance", as usually called so) between the idler and the sprocket thereby to elongate the distance between the outermost track rollers accordingly. With this modification, however, the track frame 1 is large-sized, and the running length of the crawler 6 is enlarged to raise the cost. Therefore, it has been desired to make the best use of the space within the tumbler distance thereby to make the effective ground contact length as large as possible without elongating the tumbler distance.

SUMMARY OF THE INVENTION

The present invention has been conceived to solve the problems of the prior art and has an object to provide a drive assembly for a trck-type vehicle, which can make the best use of the space within the tumbler distance thereby to make the effective ground contact length within the tumbler distance as large as possible.

According to an embodiment of the invention, there is provided a drive assembly for a track-type vehicle having a track frame, an idler and a sprocket which are arranged generally on a straight line. The drive assembly also has a plurality of track rollers disposed rotatably below the track frame and a crawler made to run around the idler, the track rollers and the sprocket. The drive assembly further comprises a single track roller unit disposed closest to the idler and closest to the sprocket, respectively, each for supporting one of the track rollers rotatably at the distal end portion of an arm attached at its proximal end portion rockably to the track frame and for bearing a vehicle body load at the distal end portion of the arm through elastic members; and a double track roller unit interposed between the two single track roller units and including a first arm attached at its proximal end portion rockably to the track frame and a second arm attached at its central portion rockably to the distal end portion of the first arm, for supporting the paired front and rear ones of the track rollers rotatably at the two end portions of the second arm.

According to this construction, the track roller closest to the idler and the track roller closest to the sprocket are supported at the arm distal end portions of the single track roller units so that the vehicle body load is borne by the arm distal end portions through the elastic members. Therefore, the horizontal distance between those two track rollers is the effective ground contact length so that the space within the tumbler distance can be exploited to the maximum thereby to enlarge the effective ground contact length. As a result, it is possible to improve the running stability of the vehicle and to enable the bulldozer to improve the ground leveling operation with the push of its blade thereby to realize a riding comfortableness with the bogie type track rollers.

The rocking fulcrums of the arms of the single track roller units and the rocking fulcrum of the first arm of the double track roller unit may be disposed closer to the idler than the distal end portions of the individual ones of the arms and the first arm. According to this construction, the rocking fulcrums of the arms of the single track roller units and the rocking fulcrum of the first arm of the double track roller unit are disposed together closer to the idler than the distal end portions of the individual ones of the arms and the first arm. Therefore, only one pin to act as the rocking fulcrum of the first arm of the double track roller unit is arranged between the track rollers of the adjoining track roller units so that the distance between the track roller units can be shortened. As a result, the track rollers can be arranged within the tumbler distance to improve the riding comfortableness at the running time. According to the positions, at which the loads are applied to the paired front and rear track rollers of the double track roller unit, the apparent moduli of elasticity of the elastic members of the double track roller unit are so differently distributed that they are gradually made smaller from the track roller close to the rocking fulcrum (or close to the idler) of the first arm of the double track roller unit to the distal end portion of the first arm and to the track roller on the sprocket side. On the other hand, the rocking fulcrums of the first arms of all the double track roller units are arranged close to the idler. Therefore, the rocking fulcrums having the large apparent elastic moduli of the double track roller units are not close to each other so that the distribution of the apparent elastic moduli of the running device is substantially homogenized within the tumbler distance. Therefore, the elastic moduli of the entire running device are homogeneously distributed so that the vehicle can be prevented from becoming vibratory in the longitudinal direction when it runs on undulations thereby to retain the running stability.

BEST MODE FOR CARRYING OUT THE INVENTION

The drive assembly of a trck-type vehicle according to the invention will be described in detail in connection with its preferred embodiments with reference to the accompanying drawings. The embodiments will be described by exemplifying the track-type vehicle in a bulldozer.

Figure 1:
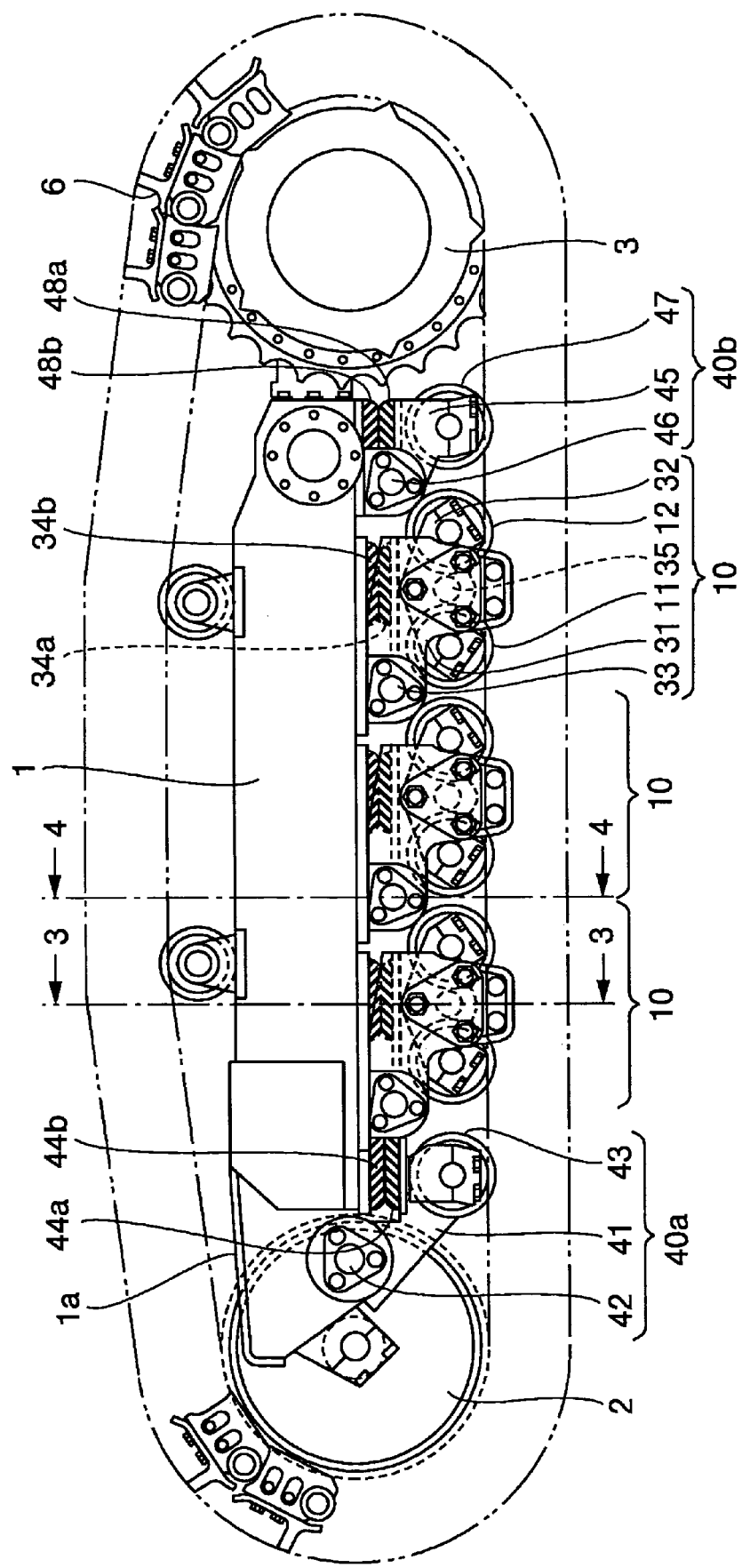
FIG. 1 is a side elevation of a drive assembly according to a first embodiment of the present invention.

The drive assembly according to the first embodiment will be described with reference to FIG. 1 to FIG. 5. In FIG. 1, a track frame 1 is provided at its one end portion with a yoke 1a, which can move in the longitudinal directions (of the vehicle) but is tensed outward in a predetermined extent through a (not-shown) spring. A track idler 2 is rotatably attached to the distal end portion of the yoke 1a. A sprocket wheel 3 is rotatably mounted on the (not-shown) vehicle body in the vicinity of the other end portion of the track frame 1. A plurality of track rollers 11, 12, 43, 47 and so on are attached in individually rocking manners to the lower portion of the track frame 1 between the idler 2 and the sprocket 3. A crawler 6 is made to run around the idler 2, the sprocket 3 and the track rollers 11, 12, 43 and 47. The track frame 1 is supported individually at its front and back by an equalizer and a pivot pin (although both are not shown) mounted on the vehicle body.

The detailed description will be made in the following. Below the track frame 1 at the position closest to the idler 2, there is disposed a single track roller unit 40a. This single track roller unit 40a has an arm 41 so attached at its proximal end portion to the lower portion of the track frame 1 as can be vertically rocked on a pin 42. The track roller 43 is rotatably mounted on the lower portion of the distal end portion of the arm 41. The pin 42 is disposed closer to the sprocket 3 than the lower roller 43. On the abutment portions of the upper portion of the distal end portion of the arm 41 and the lower portion of the track frame 1, respectively, there are mounted elastic members 44a and 44b. These elastic members 44a and 44b abut against each other to restrict the upward turn of the arm 41 and to bear the load to be applied to the track roller 43 thereby to absorb the impact, which might otherwise be received by the track roller 43.

Below the track frame 1 at the position closest to the sprocket 3, there is disposed a single track roller unit 40b. This single track roller unit 40b has an arm 45 so attached at its proximal end portion to the lower portion of the track frame 1 as can be vertically rocked on a pin 46. The track roller 47 is rotatably mounted on the lower portion of the distal end portion of the arm 45. The pin 46 is disposed at a position closer to the sprocket 3 than the track roller 47. On the abutment portions of the upper portion of the distal end portion of the arm 45 and the lower portion of the track frame 1, respectively, there are mounted elastic members 48a and 48b. These elastic members 48a and 48b abut against each other to restrict the upward turn of the arm 45 and to bear the load to be applied to the track roller 47 thereby to absorb the impact, which might otherwise be received by the track roller 47.

Figure 2:
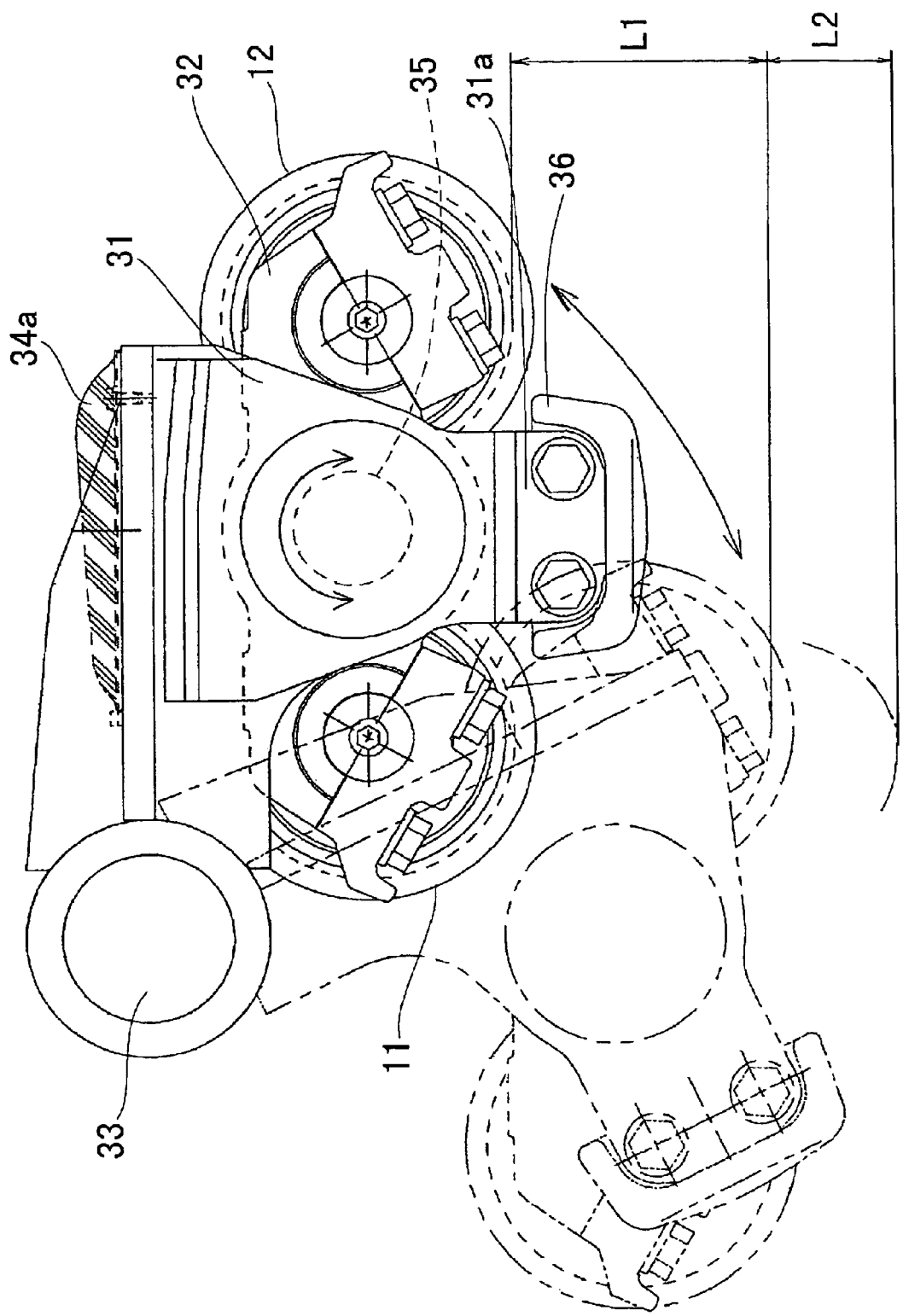
FIG. 2 is a detailed side elevation of a double track roller unit of the first embodiment.

Moreover, a predetermined number of double track roller units 10 are disposed below the track frame 1 and between the track roller 43 on the side of the idler 2 and the track roller 47 on the side of the sprocket 3. FIG. 2 is a detailed side section of the double track roller unit 10. In FIG. 2, a first arm 31 is so attached at its proximal end portion to the lower portion of the track frame 1 as can be vertically rocked on a first pin 33, and a second arm 32 is so attached at its central portion to the distal end portion of the first arm 31 as can be vertically on rocked a second pin 35. The track rollers 11 and 12 are rotatably attached individually to the two end portions of the second arm 32. Here, the first pin 33 is disposed at a position closer to the idler 2 than the second pin 35.

On the abutment portions of the upper portion of the distal end portion of the first arm 31 and the lower portion of the track frame 1, respectively, there are mounted elastic members 34a and 34b. These elastic members 34a and 34b abut against each other to restrict the upward turn of the first arm 31 and to bear the load to be applied to the lower rollers 11 and 12 thereby to absorb the impact, which might otherwise be received by the track rollers 11 and 12 when the vehicle runs on or over an undulating portion.

Figure 3:
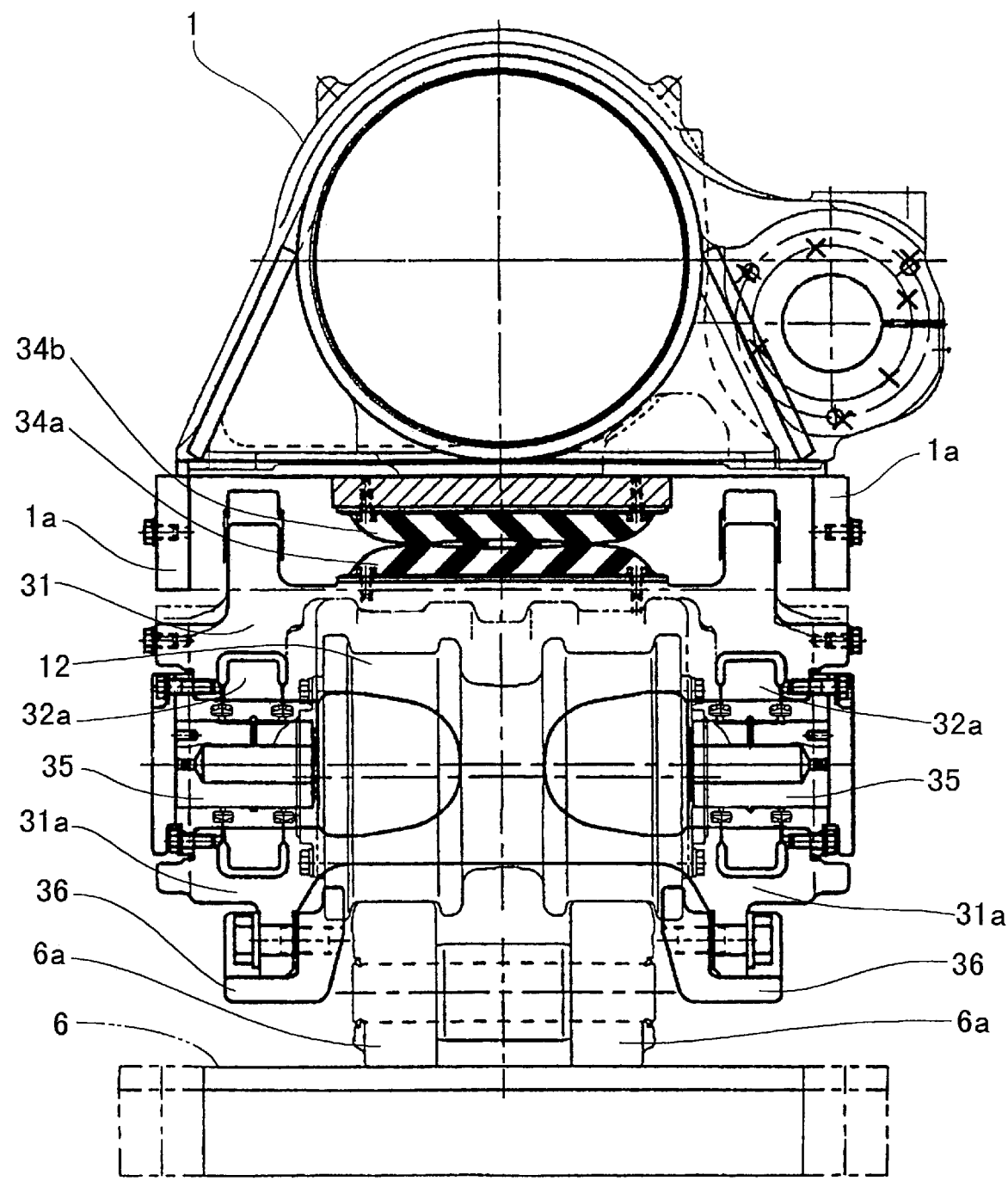
FIG. 3 is a sectional view taken along line 3—3 of FIG. 1.
Figure 4:
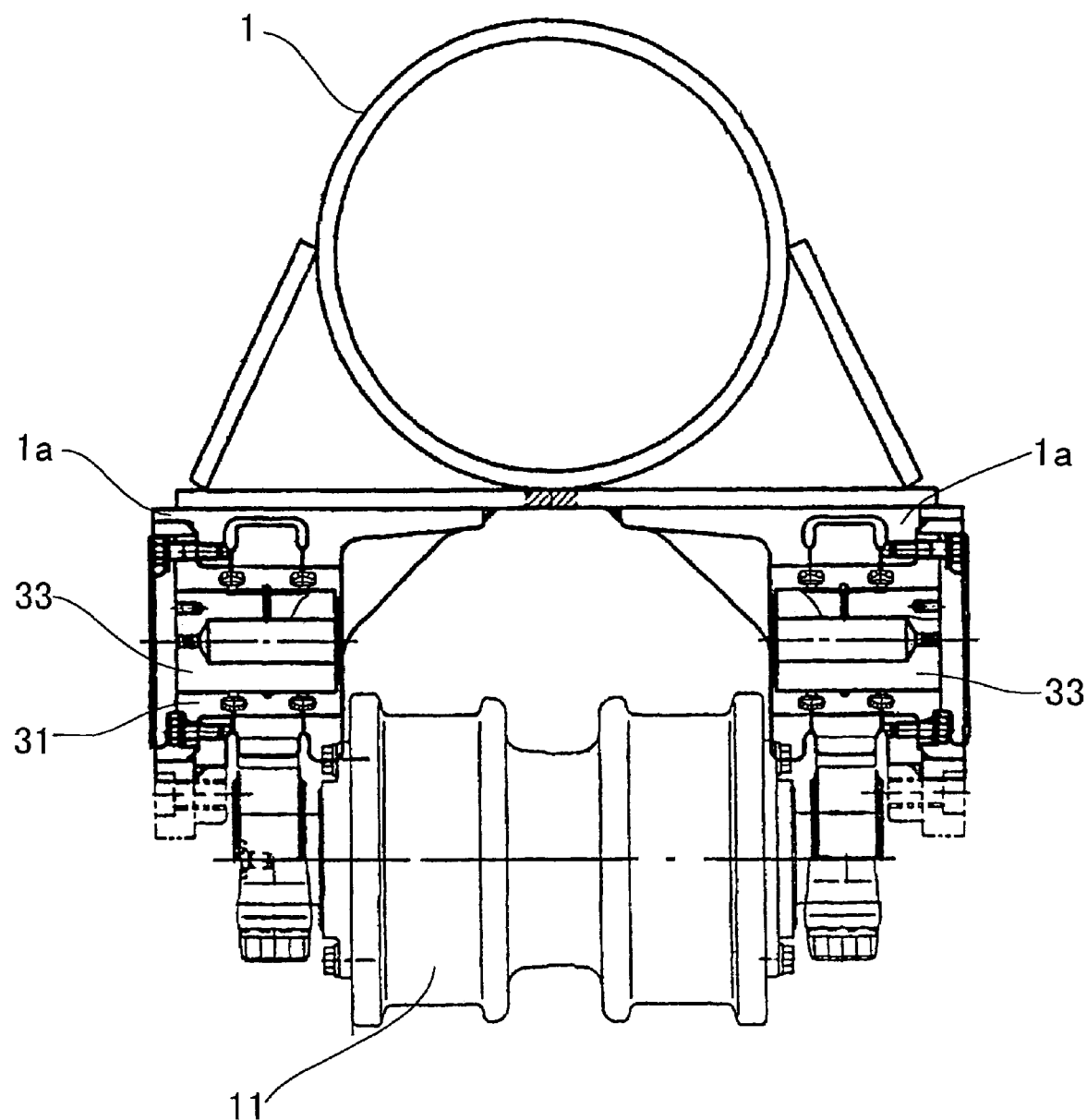
FIG. 4 is a sectional view taken along line 4—4 of FIG. 1.

Here will be described the detailed construction of the double track roller unit 10 with reference to FIGS. 3 and 4. Below the track frame 1 and on the two transverse end portions of the vehicle, there are disposed a pair of plates 1a and 1a, which extend downward. The first arm 31 is so mounted at its proximal end portions between those paired plates 1a and 1a as can be rocked on the first pins 33 and 33. The distal end portions of the first arm 31 are opened downward into such a U-shape in a transverse section as is provided at its transverse end portions with a pair of transverse support portions 31a and 31a extending downward. Likewise, the second arm 32 is provided with a pair of transverse arm members 32a and 32a. Between the paired transverse support portions 31a and 31a, there are fitted the paired transverse arm members 32a and 32a, which are rockably mounted at their central portions on the second pins 35 and 35. The lower rollers 11 and 12 are rotatably mounted individually at the two distal end portions of the second arm 32 and between the paired transverse arm members 32a and 32a.

Brackets 36 and 36 having a generally L-shaped section are so individually mounted on the inner sides of the lower end portions of the paired transverse support portions 31a and 31a that their one-side L-shaped portions are directed upward whereas their other-side portions are directed outward. The upward members of the paired transverse brackets 36 and 36 are tapered on their confronting faces to abut against link members 6a, which are transversely disposed on the inner periphery of the crawler 6. Here, the tapered faces of the paired transverse brackets 36 and 36 are held in abutment against the link members 6a thereby to prevent the crawler 6 from being transversely displaced.

Here will be the actions and effects of the construction thus far described. The single track roller units 40a and 40b are disposed at the position closest to the idler 2 and at the position closest to the sprocket 3, respectively, so that the loads to be applied to their track rollers 43 and 47 are borne by the elastic members 44a and 44b, and 48a and 48b disposed over the track rollers 43 and 47. Therefore, the distances themselves between the two track rollers 43 and 47 act as effective ground contact lengths. The two track rollers 43 and 47 are disposed closer to the idler 2 and the sprocket 3, respectively, so that the space in the tumbler distance can be optimized to enlarge the effective ground contact length. This makes it possible to improve the running stability and the tractive force and enables the bulldozer to improve the ground leveling operation with its blade.

The high following type double track roller units 10 are adopted at the longitudinally central portion of the drive assembly. As shown in FIG. 2, more specifically, the first arm 31 rocks vertically on the first pin 33 (with a large bogie stroke=L1), and the second arm 32 rocks vertically on the second pin 35 disposed at the distal end portion of the first arm 31 (with a small bogie stroke=L2). As a result, the track rollers 11 and 12 can be given a large bogie stroke (L1+L2), i.e., the sum of the two bogie strokes by the rocking motions of the two arms 31 and 32, so that the crawler 6 can have an improved followability to the vertical roughness of the ground. Even if the crawler 6 bends seriously when the drive assembly runs on the undulating portion, the track rollers 11 and 12 can follow the crawler 6 rapidly but do not leave.

Even if the vehicle runs on a rough ground having large undulations, therefore, the track rollers 11 and 12 abut against the tread of the crawler 6, so that the vehicle does not ride on the rough ground. Therefore, it is possible to prevent the crawler 6 from coming out and to improve the riding comfortableness. Moreover, the coverage of the undulations by the crawler 6 is increased so that the track rollers 11 and 12 support the vehicle body at all times. Therefore, the impact after the undulations were ridden over can be relaxed to improve the durability and the riding comfortableness of the vehicle.

In the embodiment, the rocking fulcrums of the arms 41 and 45 of the single track roller units 40a and 40b and the rocking fulcrums of the first arms 31 of the double track roller units 10 are so arranged closer to the idler than the arm distal end portions that only one of the rocking fulcrums may be interposed between the track roller units adjoining each other. Therefore, the distance between the adjoining track roller units is shortened. As a result, the individual track roller distances can be shortened to arrange the track rollers densely within the tumbler distance thereby to provide an excellent running stability.

Figure 5:
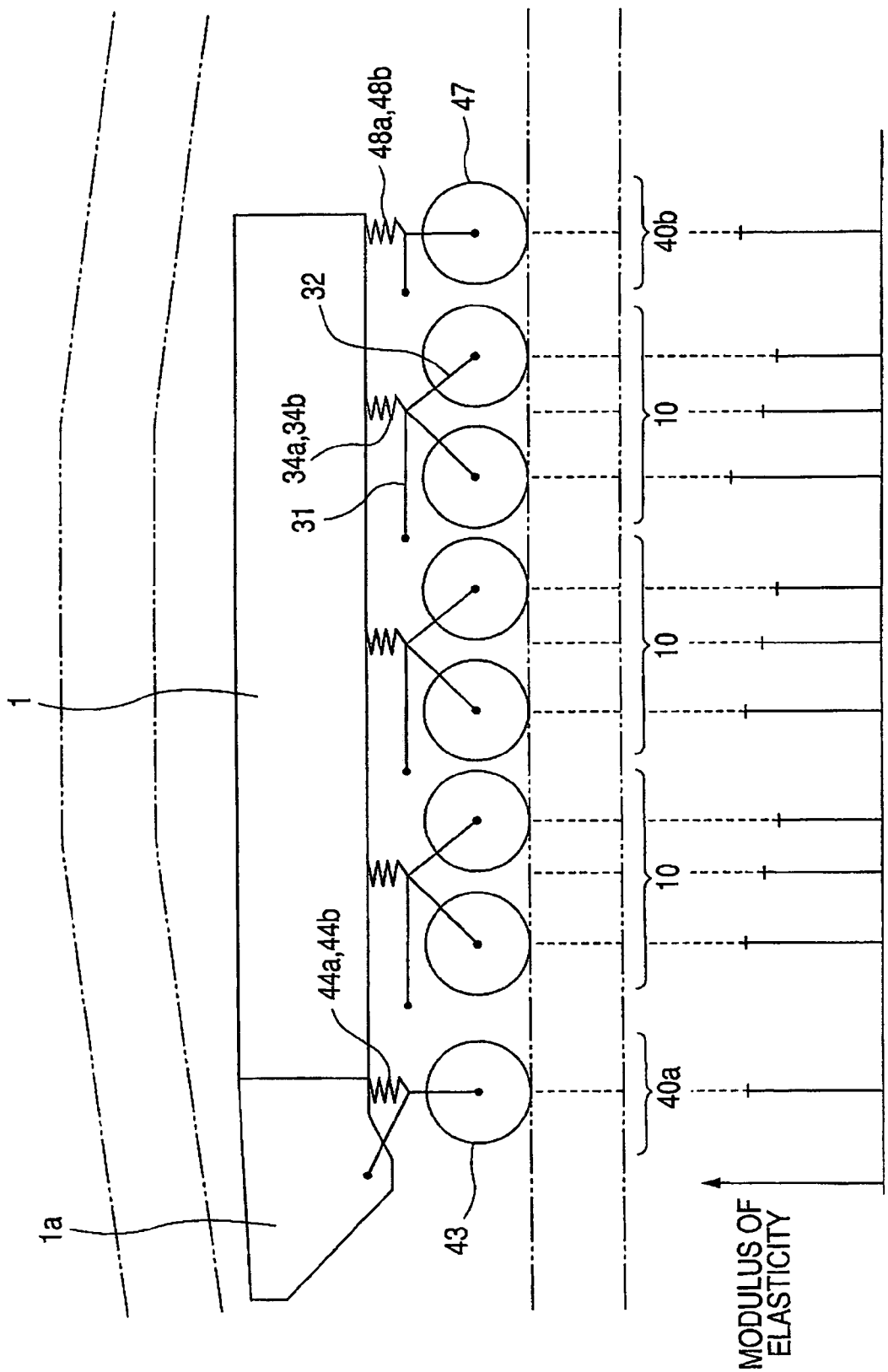
FIG. 5 is a view for explaining the actions of the first embodiment.

The elastic members 48a and 48b are mounted between the distal end portion of the first arm 31 of the double track roller unit 10 and the track frame 1, and the paired front and rear track rollers 11 and 12 are attached to the two end portions of the second arm 32, which is attached at its central portion to the distal end portion of the first arm 31. As a result, the loads to be borne by the track rollers 11 and 12 are borne on the elastic members 48a and 48b through the second arm 32 and the first arm 31. As shown in FIG. 5, therefore, the apparent moduli of elasticity of the drive assembly are so differently distributed according to the positions, at which the loads are applied to the track rollers 11 and 12, that they are gradually made smaller from the track roller 11 close to the rocking fulcrum (or the pin 33) of the first arm 31 to the distal end portion of the first arm 31 and the more distant track roller 12. The rocking fulcrums of the first arms 31 of the double track roller units 10 having such elasticity modulus distributions are arranged on the same side (i.e., closer to the idler 2 in the embodiment) of the track rollers 11 and 12 of the individual track roller units. Therefore, the distribution of the apparent elasticity moduli is substantially homogenized within the tumbler distance. Therefore, the entire drive assembly hardly rocks vibrationally in the longitudinal direction, when the vehicle runs over the undulations, thereby to improve the running performance.

Figure 6:
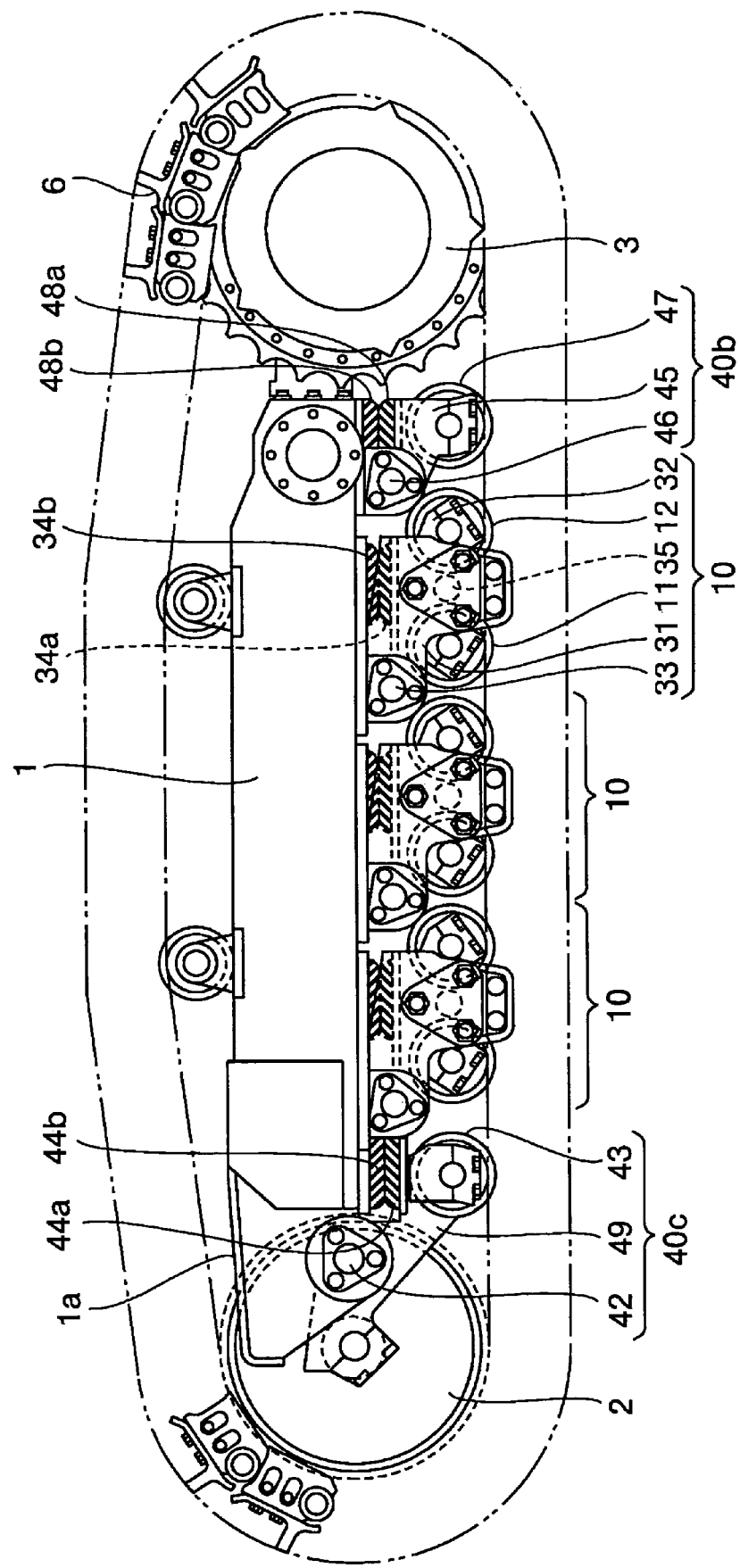
FIG. 6 is a side elevation of a drive assembly according to a second embodiment of the invention.
Figure 7:
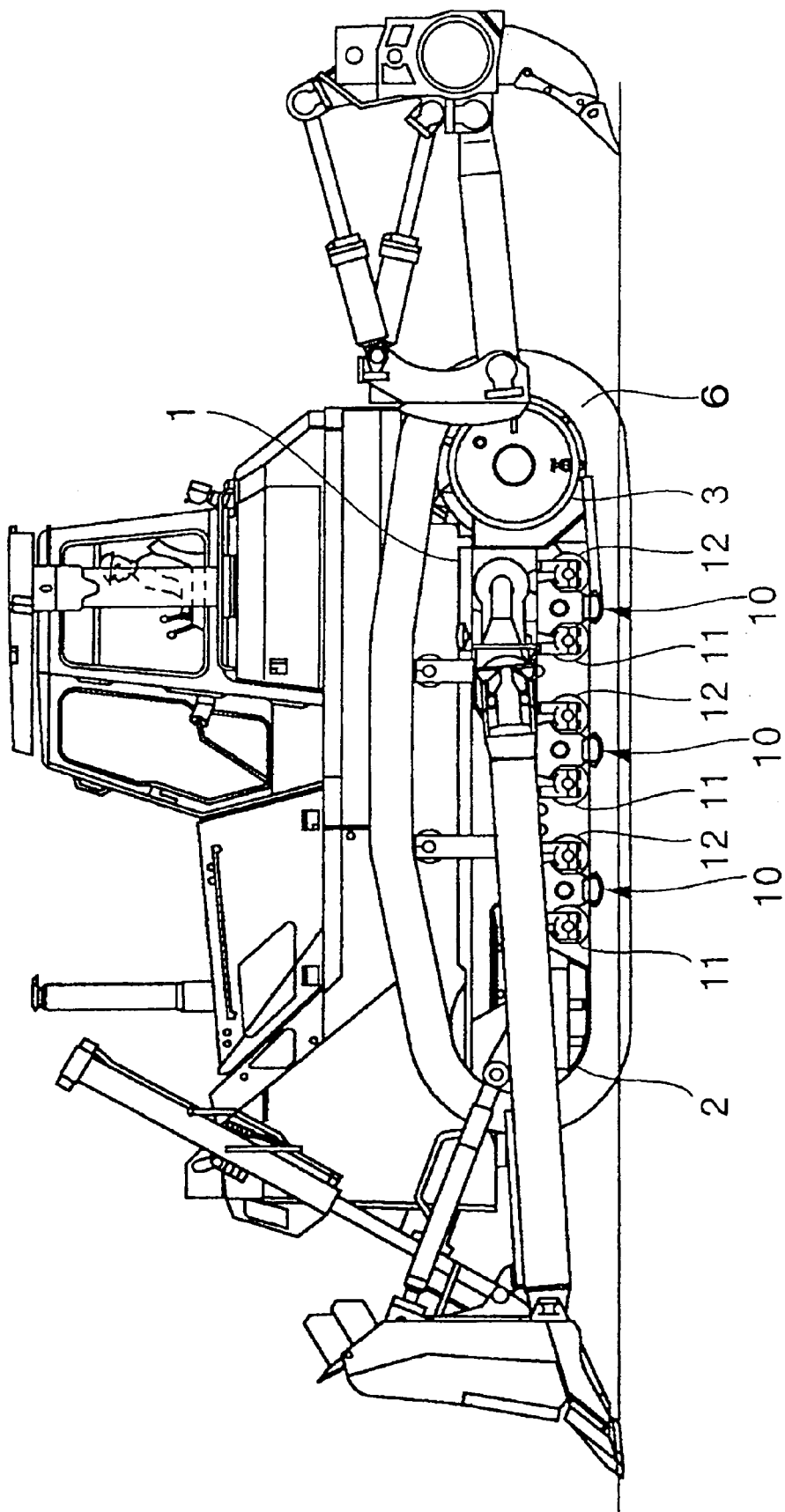
FIG. 7 is a side elevation of a bulldozer according to the prior art.
Figure 8:
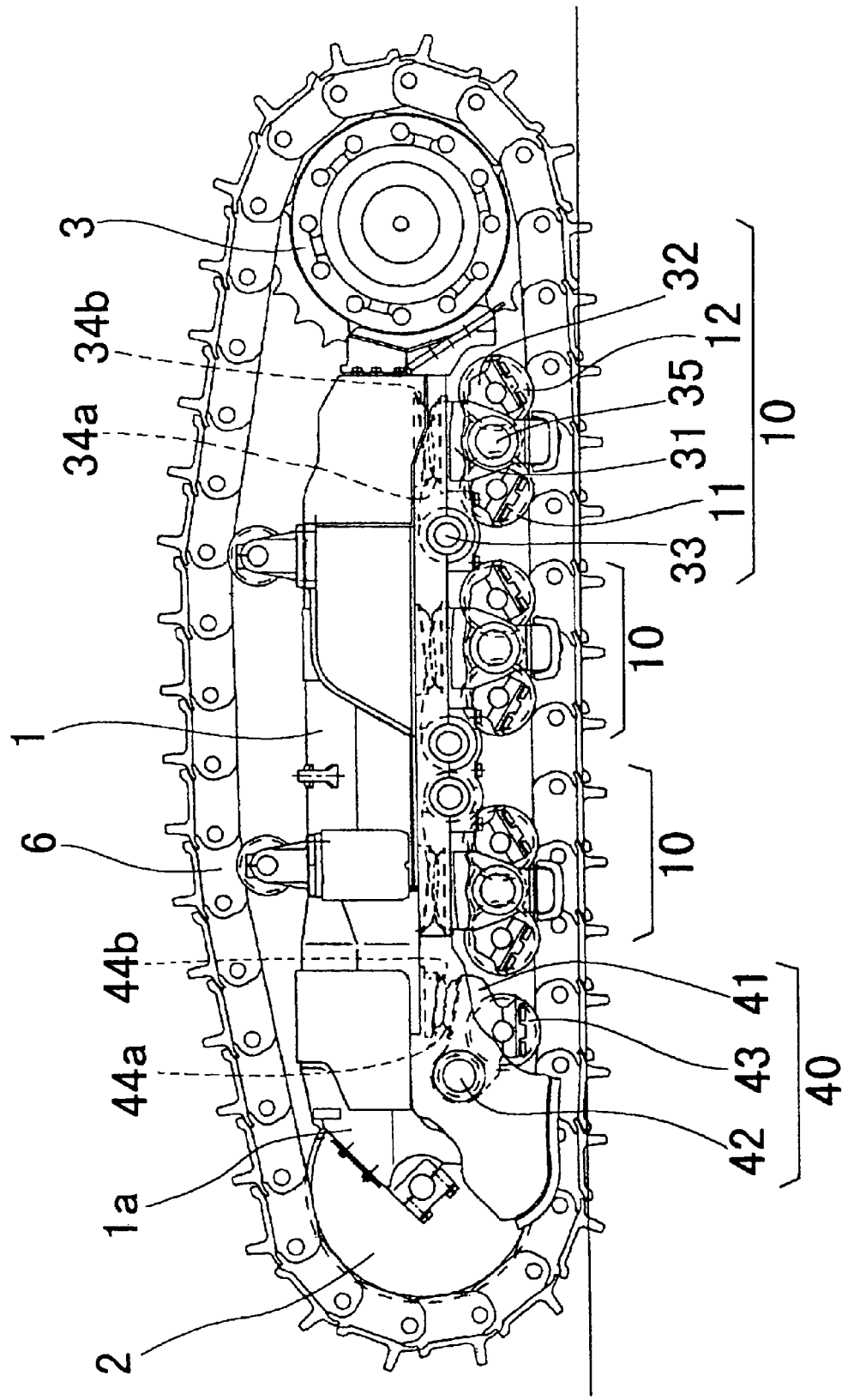
FIG. 8 is a side elevation of a drive assembly according to the prior art.

Next, a second embodiment will be described with reference to FIG. 6. In FIG. 6, an arm 49 is so attached at its longitudinal center portion to the yoke 1a mounted on one end portion of the track frame 1 as can be vertically rocked on the pin 42. The idler 2 is rotatably attached to one end portion of the arm 49, and the track roller 43 is rotatably attached to the other end portion. The elastic members 44a and 44b are mounted on the abutment portion between the other end portion of the arm 49 and the track frame 1. Here, the arm 49, the track roller 43, the pin 42 and the elastic members 44a and 44b construct a single track roller unit 40c, which rocks vertically in a balance with the idler 2 through the arm 49. Here, the remaining structures are similar to those of the first embodiment so that their description is omitted.

The structure of the second embodiment is provided with the single track roller units 40c and 40b at the positions closest to the idler 2 and the sprocket 3 and a predetermined number of double track roller units 10 between the two single track roller units 40c and 40b. As in the first embodiment, therefore, the distances between the two track rollers 43 and 47 of the two single track roller units 40c and 40b act as effective ground contact lengths. The track rollers 43 and 47 are disposed closer to the idler 2 and the sprocket 3, respectively, so that the inter-tumbler space can be optimized to enlarge the effective ground contact length. This makes it possible to improve the running stability and the tractive force. The single track roller unit 40c is constructed to rock vertically in a balance with the idler 2 through the arm 49. At the forward running time, the crawler 6 is tensed on the grounding side under a predetermined tension by the driving force of the sprocket 3. At the backward running time, the crawler 6 is loosened near the sprocket 3. Therefore, the floating phenomenon of the single track roller unit 40c by the balance structure with the idler 2 can be desirably reduced to retain the aforementioned effective ground contact length more stably.

Here, the best mode for carrying out the invention has been disclosed by the description thus far made, but the invention should not be limited thereto. That is to say, the invention has been shown and described mainly on the specific embodiments, but those skilled in the art could add various modifications to the aforementioned embodiments in the detailed construction such as shapes or numbers without departing from the scopes of the technical concept and object thereof.

What is claimed is:

1. A drive assembly for a track-type vehicle having a track frame and an idler and a sprocket arranged generally on a straight line, a plurality of track rollers disposed rotatably below said track frame, and a crawler made to run around said idler and said track rollers and said sprocket, said drive assembly comprising:

a single track roller unit disposed closest to said idler and closest to said sprocket respectively, said single track roller unit supporting said track roller rotatably at the distal end portion of an arm attached at its proximal end portion rockably to said track frame, and said single track roller unit bearing a vehicle body load at the distal end portion of said arm through elastic members; and a double track roller unit interposed between said single track roller units and including a first arm attached at its proximal end portion rockably to said track frame, and a second arm attached at its central portion rockably to the distal end portion of said first arm, for supporting the paired front and rear ones of said track rollers rotatably at the two end portions of said second arm.

2. The drive assembly for a track-type vehicle according to claim 1, wherein the rocking fulcrum of said arms of said single track roller unit and the rocking fulcrum of said first arm of said double track roller unit are disposed closer to said idler than the distal end portions of the individual ones of said arms and said first arm.

* * * * *